(12) United States Patent
Feltham et al.

(10) Patent No.: US 10,142,397 B2
(45) Date of Patent: Nov. 27, 2018

(54) NETWORK FILE TRANSFER INCLUDING FILE OBFUSCATION

(71) Applicant: International Business Machines Corporation, Armonk, NY (US)

(72) Inventors: Andrew S. Feltham, Winchester (GB); Graham White, Winchester (GB)

(73) Assignee: International Business Machines Corporation, Armonk, NY (US)

(*) Notice: Subject to any disclaimer, the term of this patent is extended or adjusted under 35 U.S.C. 154(b) by 305 days.

(21) Appl. No.: 15/090,698

(22) Filed: Apr. 5, 2016

(65) Prior Publication Data
US 2017/0289237 A1    Oct. 5, 2017

(51) Int. Cl.
| G06F 15/16 | (2006.01) |
| H04L 29/08 | (2006.01) |
| G06F 17/30 | (2006.01) |
| G06F 21/60 | (2013.01) |
| H04L 29/06 | (2006.01) |

(52) U.S. Cl.
CPC .......... *H04L 67/06* (2013.01); *G06F 17/302* (2013.01); *G06F 17/30076* (2013.01); *G06F 21/606* (2013.01); *H04L 63/0457* (2013.01); *H04L 67/02* (2013.01); *G06F 2221/2107* (2013.01)

(58) Field of Classification Search
CPC ......... H04L 67/06; H04L 65/60; H04L 67/02; H04L 67/42; G06F 17/30076; G06F 17/30082; G06F 17/302; G06F 21/606
See application file for complete search history.

(56) References Cited

U.S. PATENT DOCUMENTS

| 6,412,009 B1 | 6/2002 | Erickson et al. |
| 7,801,978 B1 | 9/2010 | Susai et al. |
| 9,367,557 B1* | 6/2016 | Lin ..................... H03M 7/3077 |
| 2002/0016922 A1* | 2/2002 | Richards ................. G06F 21/10 726/3 |
| 2011/0145313 A1* | 6/2011 | Narayanan .............. H04L 69/04 709/203 |
| 2012/0102157 A1 | 4/2012 | Kim et al. |

(Continued)

FOREIGN PATENT DOCUMENTS

| CN | 103929404 | 7/2014 |
| WO | WO2008065351 | 6/2008 |

OTHER PUBLICATIONS

BM Knowledge Center http://www-01.ibm.com/support/knowledgecenter/SSGMGV_3.1.0/com . . . , Chunked transfer-coding, Feb. 25, 2016, 1 page.

(Continued)

*Primary Examiner* — Ryan Jakovac
(74) *Attorney, Agent, or Firm* — Schmeiser, Olsen & Watts, LLP; Isaac Gooshaw

(57) ABSTRACT

A method and associated system. A server computer selects a re-ordering scheme from one or more re-ordering schemes, for re-ordering chunks of an original file. The server computer divides the file into the chunks. After the file is divided into the chunks, the server computer re-orders the chunks according to the selected re-ordering scheme to form an obfuscated file that includes the re-ordered chunks. The server computer sends, to a client computer, the obfuscated file along with a scheme access reference that enables the client computer to access the selected re-ordering scheme.

14 Claims, 7 Drawing Sheets

(56) References Cited

U.S. PATENT DOCUMENTS

2012/0155233 A1* 6/2012 Spitzlinger ............. G06F 21/10
                                                      369/30.09
2012/0233228 A1   9/2012 Barton et al.

OTHER PUBLICATIONS

Frequency-hopping spread spectrum—Wikipedia, the free encyclopedia https://en.wikipedia.org/wiki/Frequency-hopping_spread_spectrum, Feb. 25, 2016, 3 pages.

Breach—Wikipedia, the free encyclopedia https://en.wikipedia.org/wiki/Breach, Feb. 25, 2016, 2 pages.

* cited by examiner

NETWORK FILE TRANSFER INCLUDING FILE OBFUSCATION

TECHNICAL FIELD

The present invention relates to file transfer, and more specifically, to network file transfer including file obfuscation.

BACKGROUND

Hypertext Transfer Protocol (HTTP) is an Internet standards track protocol which is an application-level protocol for distribution of information in collaborative, hypermedia information systems. HTTP is a generic stateless protocol, which is a foundation of data communication for the World Wide Web. HTTP is a request/response protocol in which a client sends a request message to a server. The server, which provides resources such as Hypertext Markup Language (HTML) files and other content, returns a response message in response to a recipient who sent an earlier message. A message body of the response message may contain requested content.

Transfer encodings are values that are used to indicate an encoding transformation that has been applied to an entity-body in order to ensure safe transport through a network. The transfer encoding is a property of the message. One form of transfer encoding is "Chunked Transfer Encoding" (hereinafter, "chunked encoding").

The chunked encoding modifies the body of a message in order to transfer the message as a series of chunks Each chunk may include an indication of the chunk's own size, followed by an optional trailer containing entity-header fields, which allow dynamically produced content to be transferred along with information necessary for the recipient to verify that the recipient has received the full message.

SUMMARY

The present invention provides a method and associated system and associated computer program product. A server computer selects a re-ordering scheme from one or more re-ordering schemes, for re-ordering chunks of an original file. The server computer divides the file into the chunks. After the file is divided into the chunks, the server computer re-orders the chunks according to the selected re-ordering scheme to form an obfuscated file that includes the re-ordered chunks. The server computer sends, to a client computer, the obfuscated file along with a scheme access reference that enables the client computer to access the selected re-ordering scheme.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings.

Figure 1:
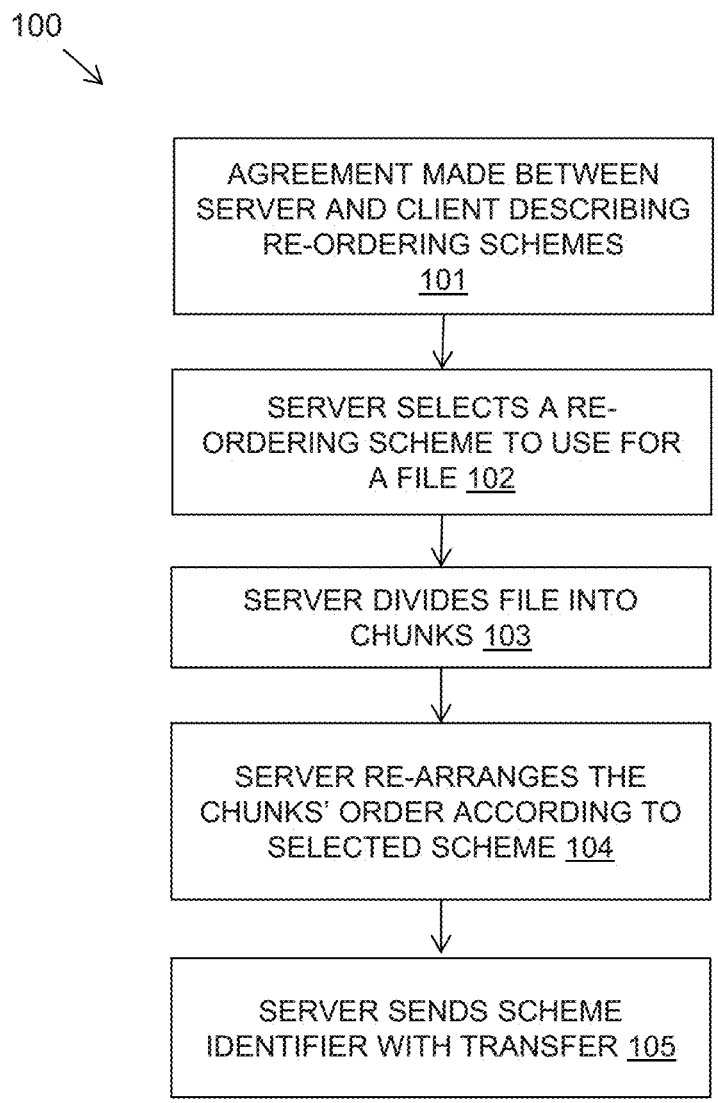
FIG. 1 is a flow diagram of an example embodiment of a method carried out at a server, in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

According to embodiments of the present invention there is provided a computer-implemented method for network file transfer carried out at a server transmitting a file, the method comprising: agreeing to one or more re-ordering schemes between the server and a client; selecting a re-ordering scheme to use for the transfer of a file; dividing the file into chunks to send using Hypertext Transfer Protocol (HTTP) chunked transfer encoding; re-arranging the order of the chunks for transfer according to the selected re-ordering scheme; transferring the re-arranged chunks of the file such that the transmitted file is obfuscated; and sending a scheme access reference with the transfer of the re-arranged chunks, wherein the scheme access reference enables the client to access the selected re-ordering scheme.

According to embodiments of the present invention, there is provided a computer-implemented method for network file transfer carried out at a client system receiving a file, the method comprising: agreeing to one or more re-ordering schemes between the client and a server; downloading a file in chunks using Hypertext Transfer Protocol (HTTP) chunked transfer encoding, wherein the chunks are in a re-arranged order resulting in an obfuscated file; receiving a scheme access reference with the downloaded file; obtaining a re-ordering scheme's details by accessing the re-ordering scheme with the scheme access reference; and re-arranging the chunks in the downloaded file according to the re-ordering scheme.

According to embodiments of the present invention, there is provided a system for network file transfer, the system including a server comprising: a processor and a memory configured to provide computer program instructions to the processor to execute the function of components of the system; a scheme agreement component for agreeing to one or more re-ordering schemes between the server and a client; a scheme selection component for selecting a re-ordering scheme to use for the transfer of a file; a dividing component for dividing the file into chunks to send using Hypertext Transfer Protocol (HTTP) chunked transfer encoding; a re-ordering component for re-arranging the order of the chunks for transfer according to the selected re-ordering scheme; a chunk sending component for transferring the re-arranged chunks of the file such that the transmitted file is obfuscated; and a scheme access sending component for sending a scheme access reference with the transfer of the re-arranged chunks, wherein the scheme access reference enables the client to access the selected re-ordering scheme.

According to embodiments of the present invention, there is provided a client system comprising: a processor and a memory configured to provide computer program instructions to the processor to execute the function of components of the system; a scheme agreement component for agreeing to one or more re-ordering schemes between the client and a server; a file download component for downloading a file in chunks using Hypertext Transfer Protocol (HTTP) chunked transfer encoding, wherein the chunks are in a re-arranged order resulting in an obfuscated file; a scheme access obtaining component for receiving a scheme access reference with the downloaded file; a scheme obtaining component for obtaining a re-ordering scheme's details by accessing the re-ordering scheme with the scheme access reference; and a file re-ordering component for re-arranging received chunks according to the re-ordering scheme.

According to embodiments of the present invention, there is provided a computer program product for network file transfer executed at a server transmitting a file, the computer program product comprising a computer readable storage medium having program instructions embodied therewith, the program instructions executable by a processor to cause the processor to: agree to one or more re-ordering schemes between the server and a client; select a re-ordering scheme to use for the transfer of a file; divide the file into chunks to send using Hypertext Transfer Protocol (HTTP) chunked transfer encoding; re-arrange the order of the chunks for transfer according to the selected re-ordering scheme; transfer the re-arranged chunks of the file such that the transmitted file is obfuscated; and send a scheme access reference with the transfer of the re-arranged chunks, wherein the scheme access reference enables the client to access the selected re-ordering scheme.

According to embodiments of the present invention, there is provided a computer program product for network file transfer executed at a client system receiving a file, the computer program product comprising a computer readable storage medium having program instructions embodied therewith, the program instructions executable by a processor to cause the processor to: agree to one or more re-ordering schemes between the client and a server; download a file in chunks using Hypertext Transfer Protocol (HTTP) chunked transfer encoding, wherein the chunks are in a re-arranged order resulting in an obfuscated file; receive a scheme access reference with the downloaded file; obtain a re-ordering scheme's details by accessing the re-ordering scheme with the scheme access reference; and re-arrange received chunks according to the re-ordering scheme.

A method of obfuscating files during network transfer of the files is described. The method rearranges the order of chunks of a file that is being transferred, using HTTP chunked file transfer, according to a re-ordering scheme or re-arrangement scheme. The re-ordering scheme may be one of multiple schemes referenced by an identifier that is transmitted with the file transfer. Alternatively, there may be a single re-ordering scheme, that is locked, to which the server and a client have a key, which enables a file to be transferred in an obfuscated form and only re-arranged for access when a recipient has the identifier or key to the re-ordering scheme. Not only does the described method enable the file to be transferred in an unreadable form, but also enables control of access to the file for distribution control.

FIG. 1 is a flow diagram 100 of an example embodiment of a method carried out server. The flow diagram 100 shows an example embodiment of the described method of a transfer of a file to a client from the server using a HTTP chunked file transfer.

In step 101, an agreement that describes a set of re-ordering schemes may be put n place between the server and one or more clients. The agreement describes a set of re-ordering schemes. Each reordering scheme has an identifier that may be used as a reference. In one embodiment, the agreement provides a list of re-ordering schemes with associated referencing identifiers. The list may include, or point to one or more algorithms for each re-ordering scheme.

In an alternative embodiment, the agreement may provide a locked (for example, encrypted or otherwise encoded) re-ordering scheme that requires a key to read the re-ordering scheme for use.

The agreement may be made at any time before, during or after a file transfer to which the agreement relates. In one embodiment, the agreement may be made after a client has downloaded a file.

The agreement may be put n place by swapping an appropriate formatted file using a Universal Serial Bus key or other file transfer mechanism. Alternatively, the agreement may involve agreeing upon some pseudo random pattern known to both parties such as that used in a RSA key.

In step 102, a server may select a re-ordering scheme to use; e.g., if there are multiple re-ordering schemes. In step 103, the server may divide a file into chunks, wherein the chunks are segments of the file. Each chunk (i.e, each segment) includes a discrete number of bytes. The chunks may be all a same size or may differ in size. The sizes of the chunks, whether uniform or varied, may be defined in the re-ordering scheme.

In step 104, the server may re-arrange the chunks into a different order according to the selected re-ordering scheme to form an obfuscated file such that a client receiving the transferred chunks will not be able to understand or interpret the file.

The dividing and re-ordering of the file may be implemented before transfer of the file commences, by re-arranging the entire file according to the re-ordering scheme to form an entirely new file, or the files available for download may be pre-processed such that the files are stored in an obfuscated format. Alternatively, the dividing and re-ordering of the file may be may be implemented dynamically by dynamically dividing the file up during transfer according to the required re-ordering scheme. For example, the server may send bytes 5-10 of the file, followed by bytes 25-30 without first having to re-arrange the file such that the bytes can be sent in an order specified by the re-ordering scheme.

In step 105, the server may send a scheme access reference in the form of a scheme identifier or key with the file transfer. The scheme access reference may indicate to the client which scheme to use to re-order the chunks or may enable the client to read the re-ordering scheme. In one embodiment, the scheme access reference may be sent at the end of the transfer in a trailer header (i.e., trailer may contain header fields) that is part of the HTTP chunked transfer specification. In another embodiment, the scheme identifier or key may be written into the HTTP headers.

Figure 2:
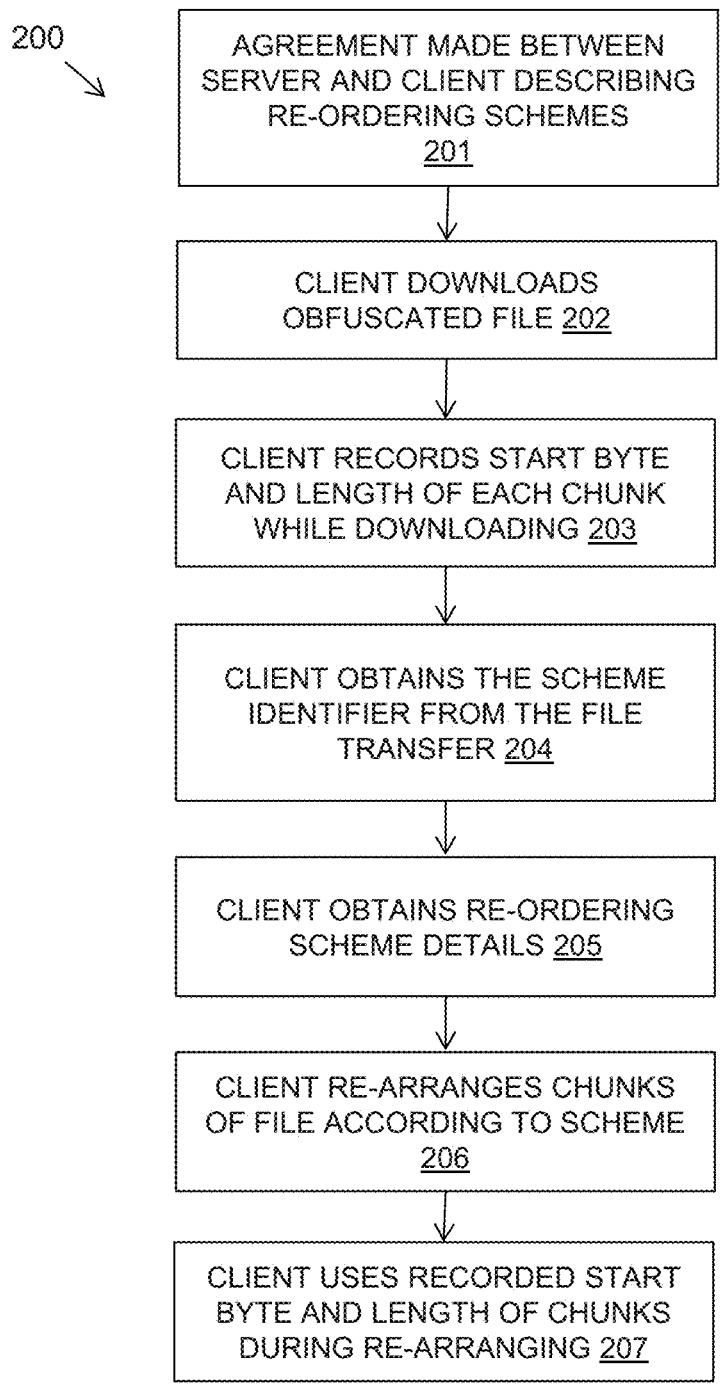
FIG. 2 is a flow diagram of an example embodiment of a method carried out at a client system, in accordance with embodiments of the present invention.

FIG. 2 is a flow diagram 200 of an example embodiment of a method carried out at a client system, in accordance with embodiments of the present invention. The flow diagram 200 shows an example embodiment of the described method of a transfer of a file to a client from a server using a HTTP chunked file transfer. The flow diagram 200 of FIG. 2 is carried out at a client.

In step 201, an agreement is put in place between the client and a server that describes a set of re-ordering schemes. Each re-ordering scheme has an identifier that may be used as a reference. In one embodiment, the agreement provides a list of re-ordering schemes with associated referencing identifiers. The list may include or point to algorithms for respective re-ordering schemes.

In an alternative embodiment, the agreement may provide a locked (for example, encrypted or otherwise encoded) re-ordering scheme that requires a key to read the re-ordering scheme for use.

The agreement may be made at any time before, during or after a transfer to which the agreement relates. In one embodiment, the agreement may be made after a client has downloaded a file.

In step 202, the client may download the file using an HTTP chunked transfer. In step 203, the client may record the start byte and length of each chunk while downloading so that the transferred form of the chunks is recorded for use during re-ordering of the chunks as explained further below. This recording of the start byte and length of each chunk may not be required and may be provided by the re-ordering scheme.

In one embodiment, the client may connect to the server and make a request to download a copy of the file. HTTP chunked transfer is used and the client may keep a record of the start byte and length of each chunk that is downloaded, which allows the client to download a full copy of the file.

In step 204, the client may obtain a scheme access reference in a form of a scheme identifier or key from the file transfer. The scheme identifier may indicate to the client which scheme to use to re-order the chunks or the key may enable a scheme to be read. In one embodiment, the scheme access reference may be sent at the end of the transfer in a trailer header that is part of the HTTP chunked transfer specification. In another embodiment, the scheme identifier may be written into the HTTP headers.

The transfer header option of HTTP chunked encoding may be used to allow the serve to communicate to the client which of the agreed re-ordering schemes is to be used. is the re-ordering scheme may be communicated using a scheme identifier that may be a link or descriptor of the re-ordering scheme and not a full description of what the re-ordering scheme is. For example, 1 million schemes may have been agreed upon for re-ordering the chunks of the file, and the server may specify that the client should use "scheme 3".

In step 205, the client may obtain the re-ordering scheme details by looking up the re-ordering scheme from the agreement with the server using the scheme identifier received with the file transfer or by reading an encoded re-ordering scheme using a key received with the file transfer.

In step 206, the client may re-arrange the chunks of the file into the order specified by the re-ordering scheme to form an authentic copy of the original file as an obfuscated file. The re-arranging may be carried out once the entire file has been received, or may be carried out dynamically as the file chunks are received. This re-arranging may depend on whether the agreement between the server and the client has already been established before the file is received.

In some embodiments, the entire file is downloaded before an agreement is established and/or before the scheme identifier is received as the entire file is transmitted in the trailer header. The entire file may be downloaded at the client and may be subsequently re-arranged. Next in step 207, the start byte and length of each chunk may be recorded and used so that the chunks may be identified in the downloaded obfuscated file.

In other embodiments, if the agreement has already been established and the scheme identifier is sent in the HTTP headers, then the file may be re-ordered dynamically as the file is received. It may not be necessary to record the start byte and length of each chunk as the file is received, since the start byte and length of each chunk may be inserted directly into a correct position in the new reconstructed file that is a re-arranged obfuscated form of the original file.

In a further embodiment, the server may also send a hash of the original file (for example, md5sum that calculates and verifies 128-bit MD5 hashes) in the transfer header such that the client may use this hash to determine that the file download and the file re-arrangement were both successful.

The described method is a form of obfuscation of a file being transferred that does not require file encryption and therefore does not require specialist encryption/decryption software at the server and client. The file may also require less processing and would not be subject to issues associated with a compromised encryption key.

HTTP Chunked Transfer

The following is a description of the HTTP chunked file transfer as used in the described method. The chunked encoding modifies the body of a message in order to transfer the message as a series of chunks, each chunk with its own size indicator, each chunk followed by a trailer containing entity-header fields, which allows dynamically produced content to be transferred along with the information necessary for the recipient to verify that the recipient has received the full message.

A chunked file transfer may be represented as:

| | | |
|---|---|---|
| Chunked-Body | = | *chunk |
| | | last-chunk |
| | | trailer |
| | | CRLF |
| chunk | = | chunk-size [ chunk-extension ] CRLF |
| | | chunk-data CRLF |
| chunk-size | = | 1*HEX |
| last-chunk | = | 1*("0") [ chunk-extension ] CRLF |
| chunk-extension | = | *( ";" chunk-ext name [ "=" chunk-ext-val ] ) |
| chunk-ext-name | = | token |
| chunk-ext-val | = | token | quoted-string |
| chunk-data | = | chunk-size(OCTET) |
| trailer | = | *(entity-header CRLF) |

The chunk-size field is a string of hex digits indicating the size of the chunk. The chunked encoding is ended by any chunk whose size is zero, followed by the trailer, which is terminated by an empty line.

The trailer allows the sender to include additional HTTP header fields at the end of the message. The trailer header field can be used to indicate which header fields are included in a trailer.

An example process for decoding a chunked body may be represented in pseudo-code as:

```
length := 0
read chunk-size, chunk-extension (if any) and CRLF
while (chunk-size > 0) {
    read chunk-data and CRLF
    append chunk-data to entity-body
    length := length + chunk-size
```

```
            read chunk-size and CRLF
        }
        read entity-header
        while (entity-header not empty) {
            append entity-header to existing header fields
            read entity-header
        }
        Content-Length := length
        Remove "chunked" from Transfer-Encoding
```

Given the use of an existing open transport protocol, any client is able to connect to the server and download files, but only those clients with the additional understanding of the re-ordering scheme trailer header will be able to decode the file. Hence the server can remain open to a number of different clients but only trusted clients will be able to decode their respective downloads.

In one embodiment, the start byte and chunk length may be determined by the client upon receipt of the file chunks, which is made possible by the HTTP Chunked Transfer protocol itself. During such a file transfer, the client may be informed by the server of the length of the HTTP Chunked. Transfer that is about to take place. That is, before each chunk is sent from server to client, the server informs the client of the length of the current incoming chunk, which allows each chunk to be a different length. The client may therefore keep track of how many chunks there are, the length of each chunk and, by extension from knowing the length of each chunk, the start byte of the next chunk which can be calculated. The HTTP Chunked Transfer protocol finishes with a zero byte transfer from server to client, after which the client knows to close the connection to the server to complete the file transfer. The re-ordering scheme may then refer to only the re-ordering of the chunks and does not need to reference the length of each chunk.

In another embodiment, the information about the length of each chunk may come from the re-ordering scheme. For example, the re-ordering scheme may indicate that chunk 1 is bytes 4-8, chunk 2 is bytes 14-24, chunk 3 is bytes 0-3, and chunk 4 is bytes 9-13.

The re-arrangement scheme may provide the re-arrangement pattern. It will be appreciated that this may be carried out in various different ways and a specific example is given. In this example, the re-arrangement pattern may be in the form of a set of the pairs [byte length, sequential order]; for example [3, 1], [7, 4], [2, 2], [5, 3]. In the preceding example, a pattern may repeat. In the preceding example, the first chunk is 3 bytes in length, and will occupy sequential order position 1 in the re-ordered file. Following the 3-byte chunk, the next chunk is a 7 byte chunk that will occupy sequential order position 4 in the re-ordered file, etc.

The following 'raw' data stream of the original file for the preceding example is:
[3 bytes] [7 bytes] [2 bytes] [5 bytes] [3 bytes] [7 bytes] [2 bytes] [5 bytes] [3 bytes] [7 bytes] [2 bytes] [5 bytes]
which will be rearranged as:
[3 bytes] [2 bytes] [5 bytes] [7 bytes] [3 bytes] [2 bytes] [5 bytes] [7 bytes] [3 bytes] [2 bytes] [5 bytes] [7 bytes].

In order to re-arrange this 'raw' data stream, a program may iterate over the pairs in the re-ordering scheme and for each pair locate the X bytes from offset Y, here X is the first value in the pair and Y is the sum of all the previous X values plus the starting offset.

The X bytes may be located and written into a new file/stream at an offset of A, where A is the sum of the first value in each pair when re-ordered in accordance with the second value in each pair, up to the current index in the iteration.

Chunk $C_K=[X_K, M]$ is in sequential position K in the raw data stream of the original file (K=1, 2, . . . ), wherein chunk $C_K$ is $X_K$ bytes and appears in sequential position M in the re-ordered data stream of the obfuscated file. Thus, $C_1=[3, 1]$ with $X_1=3$ and M=1;
$C_2=[7, 4]$ with $X_2=7$ and M=4;
$C_3=[2, 2]$ with $X_3=2$ and M=2;
$C_4=[5, 3]$ with $X_4=5$ and M=3;

$Y_M$ denotes the offset (i.e., starting position) of the $M^{th}$ sequential chunk in the re-ordered data stream. $Y_0$ denotes the starting offset. $Y_1=Y_0$ and $Y_M=Y_{M-1}=B_{M-1}$ (M=2, 3, . . . ), wherein $B_{M-1}$ is the number of bytes of the $(M-1)^{th}$ sequential chunk in the re-ordered data stream. Thus, $B_{M-1}$ is $X_K$ corresponding to M-1, which enables the offsets to be calculated iteratively using M as an iteration index.

In the preceding example, $Y_0=1$.

Thus, the first sequential chunk in the re-ordered data stream is $C_1$ corresponding to M=1, and $Y_1=Y_0=1$.

The second sequential chunk in the re-ordered data stream is $C_3$ corresponding to M=2, with $Y_2=Y_1+X_1=4$ since $X_1$ corresponds to M=1.

The third sequential chunk in the re-ordered data stream is $C_4$ corresponding to M=3, with $Y_3=Y_2+X_3=6$ since $X_3$ corresponds to M=2.

The fourth sequential chunk in the re-ordered data stream is $C_2$ corresponding to M=4, with $Y_4=X_4=11$ since $X_4$ corresponds to M=3.

Thus, chunks $C_1$, $C_3$, $C_4$ and $C_2$ appear sequentially in the re-ordered data stream with offsets of 1, 4, 6 and 11, respectively.

Following the complete iteration of the pairs, the starting offset may be incremented by the sum of all the chunk sizes, which may be shown by the following code:

```
var schemes = [ array of all schemes ]
var currentScheme = 3;
var schemeDetails = schemes [ currentScheme ] ; // ie [ [ 3, 1
], [ 7, 4 ], [ 2, 2], [ 5, 3 ] ]
var orderedSchemeDetails = sort ( schemeDetails ) // ie, [ [ 3, 1
], [ 2, 2 ], [ 5, 3 ], [ 7, 4 ] ]
var ofbuscatedData = { bytes }
var originalData = { }
var schemeLength = 0;
foreach ( orderedSchemeDetails as details ) {
    schemeLength += details [0]
}
var offset = 0;
while ( not {endOf} obfuscatedData ) {
    var tmpOffset = 0;
    for { var i = 0; i < sizeOf ( schemeDetails ); i++ ) {
        var details = schemeDetails [i];
        var bytes = locate { ofbuscatedData, offset +
tmpOffset, details [ 0 ] ); // get the X bytes from the offset.
        var targetOffset = 0;
        for ( var j = 0; j < sizeOf (
orderedSchemeDetails ); j++ ) {
            var tmpDetails = orderedSchemeDetails[j];
            targetOffset += tmpDetails [ 0 ];
            if ( tmpDetails [ 1 ] == details [ 1 ] )
        {
                break;
            }
        }
        writeBytes ( originalData, targetOffset, bytes );
        tmpOffset += details [ 0 ];
```

```
    }
    offset += schemeLength;
}
return originalData;
```

The preceding example demonstrates a pattern that may repeat. However, in other embodiments two or more patterns may be provided which may be alternated or interleaved.

The described methods and systems provide a secure way to transfer files between client and server on-the-fly.

Conventional encrypted file transfer takes one of two forms. The first form is for the file to be sent unencrypted but using an encrypted secure transport (for example, Transport Layer Security (TLS) or Secure Sockets Layer (SSL)). The second form is to encrypt the file before transfer and decrypt the file post transfer (for example, Pretty Good Privacy (PGP)).

The described method has advantages over the first conventional method of a secure transport method. The described method does not require a secure transport and uses a standard known protocol to transfer a file with the addition of the described encoding technique.

Encrypted transfers such as that used in SSL have a much higher latency than non-encrypted transfers that typically triples the amount of data required and the number of handshakes required.

The described method is easy to configure and it has lower latency, requires less data transferred during handshaking, and requires fewer transfers or the handshake.

The described method has advantages over the second conventional method of encryption/decryption method. The described method does not require any additional encryption/decryption software to be installed at both sides of the transfer.

Encrypted transfers have an overhead on the packets being transferred since most encryption algorithms require some form of additional information or padding to be sent with each packet. Therefore, the used bandwidth increase with encryption since the number of packets will grow. There is no increased bandwidth in the described method beyond a very small payload sent once at the end of the transfer.

Encryption requires Central Processor Unit (CPU) overhead, which may be considered negligible at the server side but is of significance at a client side. Therefore, the described method offers the advantage of a similar CPU load on the server side but without the drawback of added CPU time client side.

Encrypted file transfers are very difficult to load balance requiring a lot of administrative knowledge and configurating to achieve. The described method has the same level of load-balancing as HTTP and the same requirement configuration as HTTP.

Caching is also difficult with encrypted transfers. If serving lots of clients, the server must hand-shake separately with each of the clients and serve each of the clients individually. The described method offers the same level of caching as HTTP transfers to any clients downloading the file using the same re-arrangement key.

The HTTP protocol allows for a content-encoding header as well as the transfer-encoding header used by the HTTP chunked encoding transfer mechanism (in place of the standard HTTP content-length header). This allows HTTP transfers to take place using further encoding mechanism such as gzip compression, which is advantageous in that the file content is compressed by the server before being sent over the network and hence the size of the transferred payload is reduced. This type of dynamic compression and decompression is possible using encrypted transfers, wherein the compression takes place before encryption, but has been shown to open up security holes. The use of transfer-encoding to compress data sent via the described method remains possible and does not affect the level of security offered.

EXAMPLE

As an example application of the described method and system, a small device in the field capturing images via a camera is provided. The images are stored locally for some period of time and served via HTTP. When a new capture of an image is taken, the device publishes a Uniform Resource Locator to a message broker. This allows a number of subscribed clients to connect to the device in order to download the image.

Being a small Internet of Things device in the field, the device does not have a large amount of processing capacity and is connected by a slow network link. Using the described method and system, there is no need to configure SSL/TLS and no need to accommodate the complexities and cost surrounding certificates and certificate acceptance at the client.

The device is able to take advantage of quicker file transfers to the clients due to the reduced latency and increased bandwidth offered with no additional CPU overhead required by encryption on the small device of a client. Given that many clients connect to the Internet Of Things (IOT) device over a slow link, the clients can take advantage of caching both on the serve and anywhere else on the network, since the inventive method will work without any configuration in the same way as plain HTTP transfers. The images are already compressed on the server and the owners have chosen not to use gzip transfer-encoding which is available to them.

Figure 3:
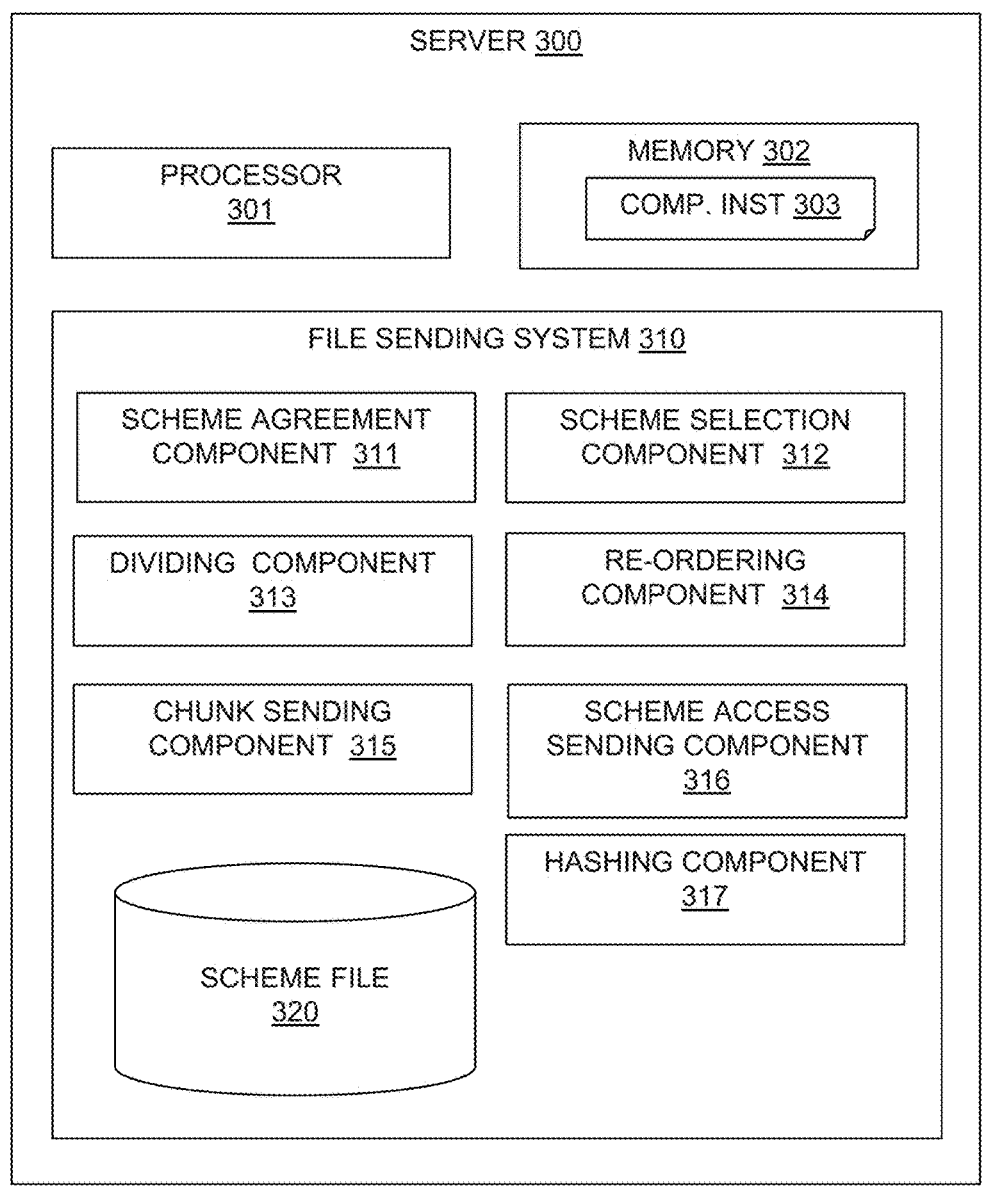
FIG. 3 is block diagram of an example embodiment of a system in the form of a server, in accordance with embodiments of the present invention.

FIG. 3 is block diagram of an example embodiment of a system in the form of a server, in accordance with embodiments of the present invention.

The server may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The server 300 may include a file sending system 310 using the HTTP chunked file transfer protocol. The file sending system 310 may be implemented as a server plugin. For example, a HTTP web server may have a requirement to allow the server side to understand the re-ordering scheme and send the appropriate parts of the file for each chunk of the transfer.

The file sending system 310 may include a scheme agreement component 311. In one embodiment, the scheme agreement component 311 may be for agreeing to a choice of multiple re-ordering schemes between the server 300 and one or more clients. Pre-agreed re-ordering schemes may be provided in a scheme file 320 in data storage at the server 300 or accessible from the server 300. The scheme file 320 may include look-up capabilities using a scheme identifier. The scheme agreement component 311 may supply clients with the scheme file 320 including scheme identifiers, at a time which may be prior to a file transfer, during the file transfer or subsequent to the file transfer.

In another embodiment, the scheme agreement component 311 may provide a re-ordering scheme which is encoded and for which access is provided by providing a decoding key.

The file sending system 310 may include a scheme selection component 312 for selecting a re-ordering scheme as stored in the scheme file 320 to use for the transfer of a file.

The file sending system 310 may include a dividing component 313 for dividing the file into chunks to send using HTTP chunked transfer encoding and may include a re-ordering component 314 for re-arranging the order of the chunks for transfer according to the selected re-ordering scheme.

The re-ordering component 314 may re-arrange the file prior to transfer or may re-arrange the file dynamically as the chunks are transferred.

The file sending system 310 may include a chunk sending component 315 for transferring the re-arranged chunks of the file such that the transmitted file is obfuscated and may include a scheme identifier sending component 316 for sending a scheme identifier or key with the transfer of the re-arranged chunks. The scheme access sending component 316 may send the scheme identifier or key in the chunk headers or in a trailer header of the HTTP chunked file transfer.

The file sending system 310 may include a hashing component 317 for sending a hash of the original file with the transfer of the chunks.

Figure 4:
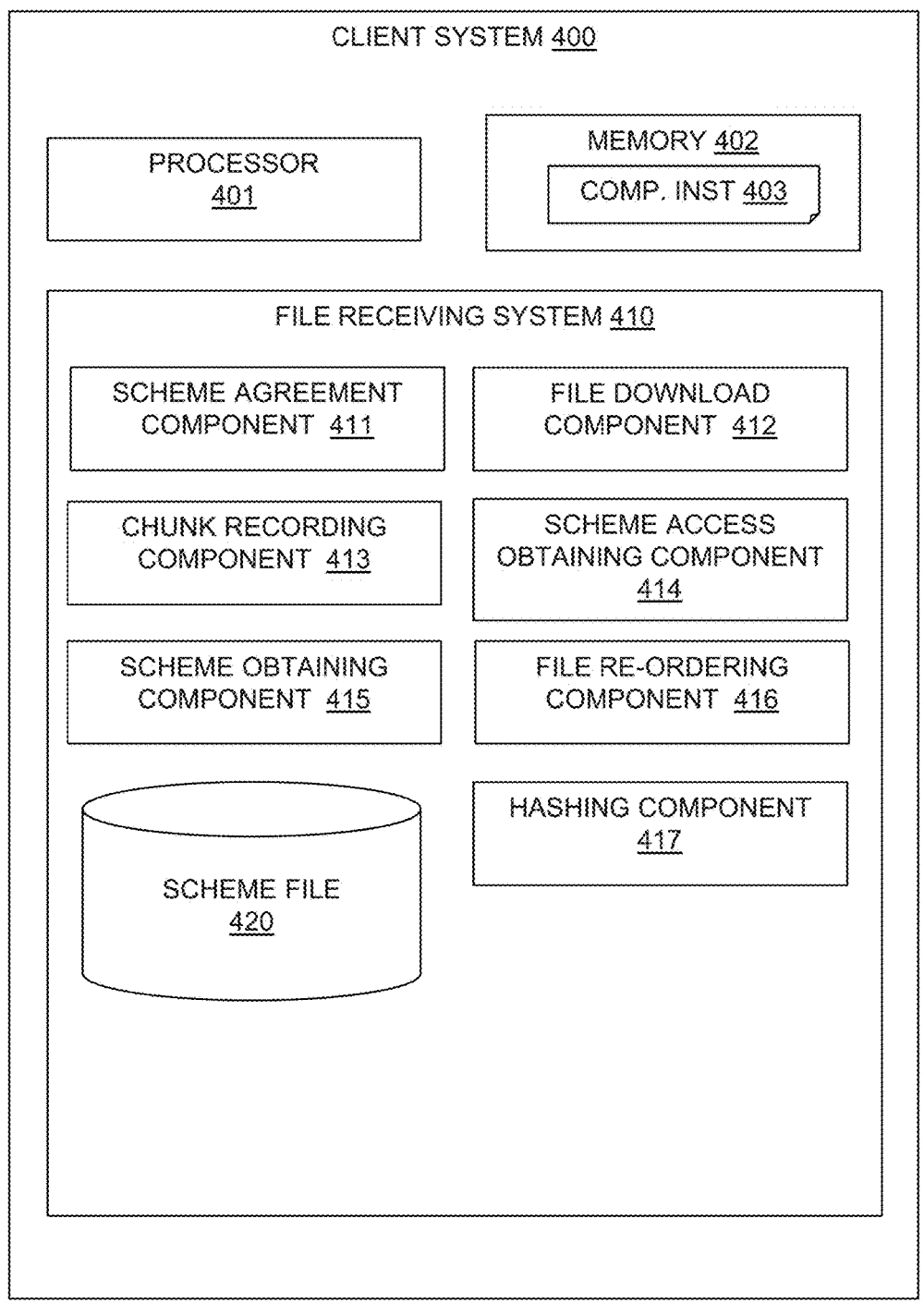
FIG. 4 is block diagram of an example embodiment of a system in the form of a client system, in accordance with embodiments of the present invention.

FIG. 4 is block diagram of an example embodiment of a system in the form of a client system 400, in accordance with embodiments of the present invention.

The client system 400 may include at least one processor 401, a hardware module, or a circuit for executing the functions of the described components which may be software units executing on the at least one processor. Memory 402 may be configured to provide computer instructions 303 to the at least one processor 401 to carry out the functionality of the components.

The client system 400 may include a file receiving system 410 using the HTTP chunked file transfer protocol. The file receiving system 410 may be implemented as a client browser plugin or built into the client browser. For example, an HTTP browser may have a requirement in order to allow the client side to understand the re-ordering scheme. However, file transfers over HTTP are not limited to web browsers and therefore, the file receiving system 410 may be implemented in various tools or programs such as command line tools, custom programs, etc.

The file receiving system 410 may include a scheme agreement component 411. In one embodiment, the scheme agreement component 411 may be for agreeing to a choice of multiple re-ordering schemes between the client and a specific server from which it would like to receive file downloads. Pre-agreed re-ordering schemes may be provided in a scheme file 420 in data storage at the client system 400 or accessible from the client system 410. The scheme file 420 may include look-up capabilities using a scheme identifier. The scheme agreement component 411 may receive the scheme file 420 including scheme identifiers from the server, at a time which may be prior to a file transfer, during the transfer or subsequent to the file transfer.

In another embodiment, the scheme agreement component 411 may provide a re-ordering scheme which is encoded and for which access is provided by providing a decoding key.

The file receiving system 410 may include a file download component 412 for downloading a file in chunks using HTTP chunked transfer encoding, wherein the chunks are received in a re-arranged order resulting in an obfuscated file.

The file receiving system 410 may include a scheme access obtaining component 414 for receiving a scheme identifier or key with the downloaded file. The scheme identifier or key may be received in the chunk headers or in the trailer header.

The file receiving system 410 may include a scheme obtaining component 415 for obtaining a re-ordering scheme's details by referencing an agreed choice of re-ordering scheme from the scheme file 420 using the scheme identifier or by accessing the re-ordering scheme by decoding it.

The file receiving system 410 may include a file re-ordering component 416 for re-arranging received chunks according to the re-ordering scheme. The file re-ordering component 416 may re-arrange the file after downloading the entire file with reference to a recorded start byte of a chunk and the size of the chunk. A chunk recording component 413 may be provided to record the start byte of each chunk and the size of each chunk for use when re-arranging the received file. In another embodiment, the file re-ordering component 416 may re-arrange the file dynamically as the chunks are received.

The file receiving system 410 may include a hash receiving component 417 for receiving a hash of the original file with the transfer of the chunks enabling the verification of the content of the transferred file.

Figure 5:
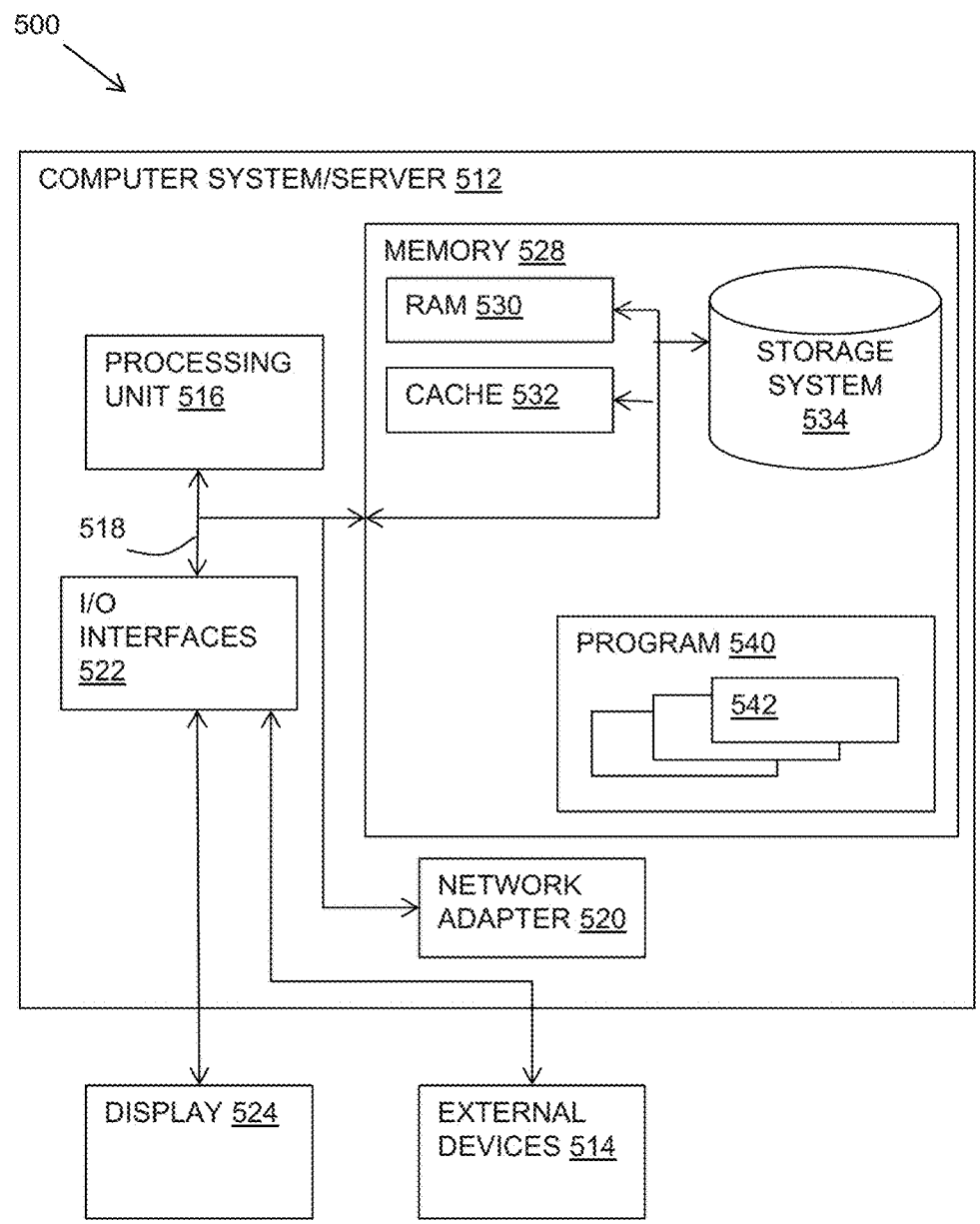
FIG. 5 is a block diagram of an embodiment of a computer system or cloud server in which embodiments of the present invention may be implemented.

FIG. 5 is a block diagram of an embodiment of a computer system or cloud server 512 in which embodiments of the present invention may be implemented The computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, the computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable storage media. Such storage media may be any available storage media that is accessible by computer system/server 512, and it includes both volatile and non-volatile storage media, and both removable and non-removable storage media.

System memory 528 can include computer system readable storage media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic storage media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical storage media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted in FIG. 5, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
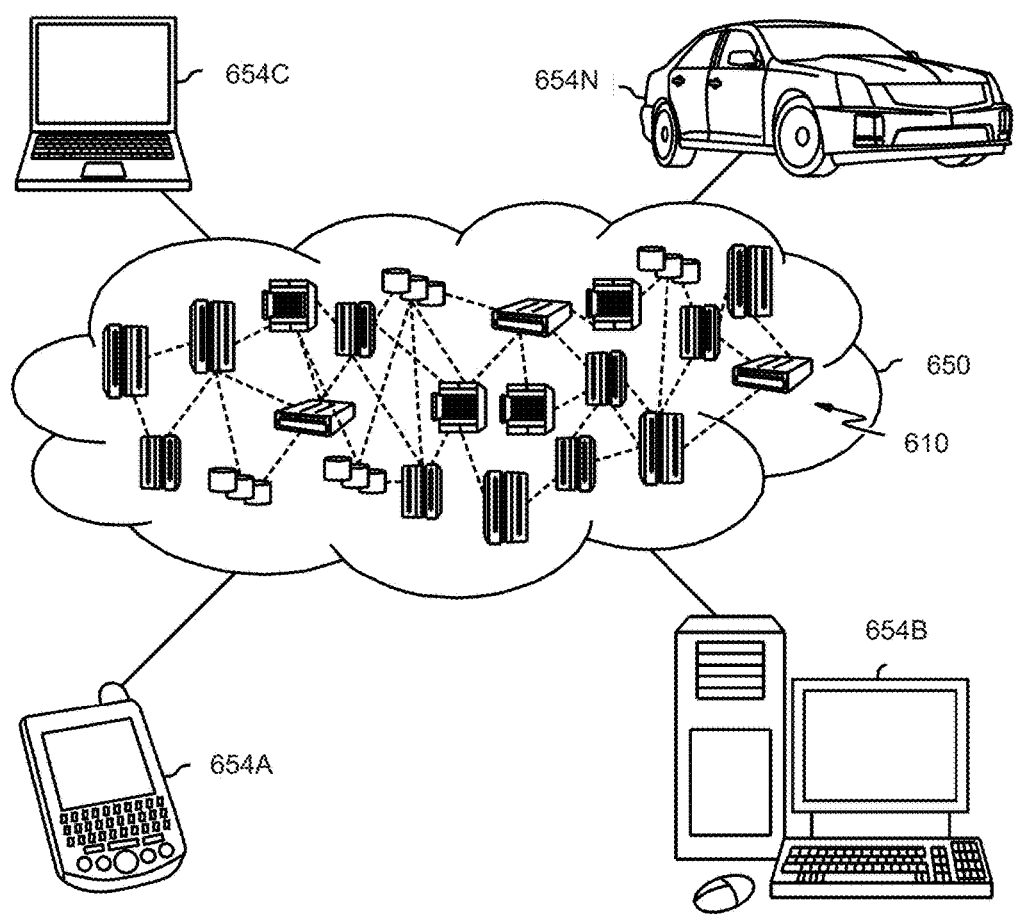
FIG. 6 is a schematic diagram of a cloud computing environment in which embodiments of the present invention may be implemented.

FIG. 6 is a schematic diagram of a cloud computing environment 650 in which embodiments of the present invention may be implemented. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. The nodes 610 may be grouped (not shown) physically or virtually, in one or more networks, such as Private, Community, Public, or Hybrid clouds as described hereinabove, or a combination thereof, which allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
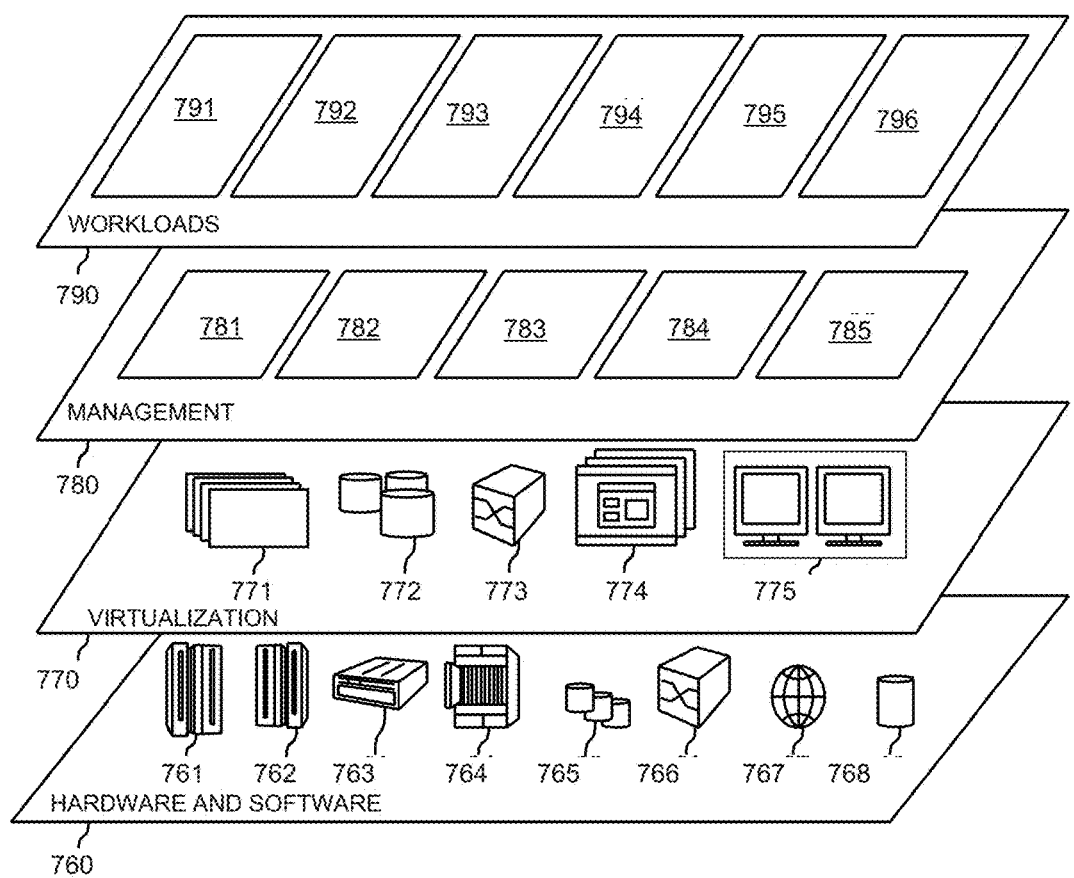
FIG. 7 is a diagram of abstraction model layers of a cloud computing environment in which embodiments of the present invention may be implemented.

FIG. 7 is a diagram of abstraction model layers of a cloud computing environment in which embodiments of the present invention may be implemented. In FIG. 7, a set of functional abstraction layers provided by cloud computing environment 650 (FIG. 1) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and file transfer processing 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes one or more computer readable hardware storage devices having computer readable program code stored therein, said program code containing instructions executable by one or more processors to implement the methods of the present invention.

A computer system of the present invention includes one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method, said method comprising:

selecting, by a server computer, a re-ordering scheme from one or more re-ordering schemes for re-ordering chunks of an original file, wherein N denotes the total number of chunks in the original file, and wherein N is at least 2;

dividing, by the server computer, the file into the chunks;

after said dividing the file into the chunks, re-ordering, by the server computer, the chunks according to the selected re-ordering scheme to form an obfuscated file comprising the re-ordered chunks, wherein the selected re-ordering scheme specifies for each chunk in the original file a position of said each chunk in the obfuscated file, and wherein said re-ordering comprises performing N iterations such that in iteration I the position of chunk I in the obfuscated file is determined to be the position of chunk I specified in the selected re-ordering scheme, for I=1, 2, . . . N; and sending, by the server computer to a client computer, the obfuscated file, using Hypertext Transfer Protocol (HTTP) Chunked Transfer Encoding, along with a scheme access reference consisting of a decoding key that points to the selected re-ordering scheme and enables the client computer to access and decode the selected re-ordering scheme, wherein the method does not use a conventional encrypted file transfer in which a file to be sent unencrypted uses an encrypted secure transport, and wherein the method does not use a conventional encrypted file transfer in which a file to be sent encrypted is encrypted before being sent and is decrypted after being sent.

2. The method of claim 1, wherein said sending comprises including the scheme access reference in a header of each chunk or in a trailer sent at an end of all of the chunks.

3. The method of claim 1, wherein said dividing the file into the chunks comprises dividing the file into chunks of a discrete number of bytes in each chunk.

4. The method of claim 3, wherein the discrete number of bytes differs in at least two chunks in the divided file.

5. The method of claim 1, wherein the method further comprises:

before said selecting the re-ordering scheme, said server computer receiving agreement, between the server computer and the client computer, to the one or more re-ordering schemes.

6. The method of claim 1, wherein said sending comprises sending, to the client computer, a hash of the original file along with the obfuscated file and the scheme access reference.

7. A computer program product, comprising one or more computer readable hardware storage devices having computer readable program code stored therein, said program code containing instructions executable by one or more processors of a server computer to implement a method, said method comprising:

selecting, by the server computer, a re-ordering scheme from one or more re-ordering schemes for re-ordering chunks of an original file, wherein N denotes the total number of chunks in the original file, and wherein N is at least 2;

dividing, by the server computer, the file into the chunks;

after said dividing the file into the chunks, re-ordering, by the server computer, the chunks according to the selected re-ordering scheme to form an obfuscated file comprising the re-ordered chunks, wherein the selected re-ordering scheme specifies for each chunk in the original file a position of said each chunk in the obfuscated file, and wherein said re-ordering comprises performing N iterations such that in iteration I the position of chunk I in the obfuscated file is determined to be the position of chunk I specified in the selected re-ordering scheme, for I=1, 2, . . . N; and sending, by the server computer to a client computer, the obfuscated file, using Hypertext Transfer Protocol (HTTP) Chunked Transfer Encoding, along with a scheme access reference consisting of a decoding key that points to the selected re-ordering scheme and enables the client computer to access and decode the selected re-ordering scheme, wherein the method does not use a conventional encrypted file transfer in which a file to be sent unencrypted uses an encrypted secure transport, and wherein the method does not use a conventional encrypted file transfer in which a file to be sent encrypted is encrypted before being sent and is decrypted after being sent.

8. The computer program product of claim 7, wherein said sending comprises including the scheme access reference in a header of each chunk or in a trailer sent at an end of all of the chunks.

9. The computer program product of claim 7, wherein said dividing the file into the chunks comprises dividing the file into chunks of a discrete number of bytes in each chunk.

10. The computer program product of claim 9, wherein the discrete number of bytes differs in at least two chunks in the divided file.

11. A system comprising a server computer that comprises one or more processors, one or more memories, and one or more computer readable hardware storage devices, said one or more hardware storage device containing program code executable by the one or more processors via the one or more memories to implement a method, said method comprising:

selecting, by the server computer, a re-ordering scheme from one or more re-ordering schemes for re-ordering chunks of an original file, wherein N denotes the total number of chunks in the original file, and wherein N is at least 2;

dividing, by the server computer, the file into the chunks;

after said dividing the file into the chunks, re-ordering, by the server computer, the chunks according to the selected re-ordering scheme to form an obfuscated file comprising the re-ordered chunks, wherein the selected re-ordering scheme specifies for each chunk in the original file a position of said each chunk in the obfuscated file, and wherein said re-ordering comprises performing N iterations such that in iteration I the position of chunk I in the obfuscated file is determined to be the position of chunk I specified in the selected re-ordering scheme, for I=1, 2, . . . N; and sending, by the server computer to a client computer, the obfuscated file, using Hypertext Transfer Protocol (HTTP) Chunked Transfer Encoding, along with a scheme access reference consisting of a decoding key that points to the selected re-ordering scheme and enables the client computer to access and decode the selected re-ordering scheme, wherein the method does not use a conventional encrypted file transfer in which a file to be sent unencrypted uses an encrypted secure transport, and wherein the method does not use a conventional encrypted file transfer in which a file to be sent encrypted is encrypted before being sent and is decrypted after being sent.

12. The system of claim 11, wherein said sending comprises including the scheme access reference in a header of each chunk or in a trailer sent at an end of all of the chunks.

13. The system of claim 11, wherein said dividing the file into the chunks comprises dividing the file into chunks of a discrete number of bytes in each chunk.

14. The system of claim 13, wherein the discrete number of bytes differs in at least two chunks in the divided file.

* * * * *